US009239712B2

United States Patent
Rong et al.

(10) Patent No.: US 9,239,712 B2
(45) Date of Patent: Jan. 19, 2016

(54) SOFTWARE PIPELINING AT RUNTIME

(71) Applicant: Intel Corporation, Santa Clara, CA (US)

(72) Inventors: Hongbo Rong, San Jose, CA (US); Hyunchul Park, Santa Clara, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 13/853,430

(22) Filed: Mar. 29, 2013

(65) Prior Publication Data

US 2014/0298306 A1    Oct. 2, 2014

(51) Int. Cl.
*G06F 9/45* (2006.01)

(52) U.S. Cl.
CPC .............. *G06F 8/4452* (2013.01); *G06F 8/433* (2013.01)

(58) Field of Classification Search
CPC ...................................................... G06F 8/4452
USPC ........................................................ 717/153
See application file for complete search history.

(56) References Cited

U.S. PATENT DOCUMENTS

| 5,920,724 | A  | * | 7/1999  | Chang           | 717/161 |
| 6,044,222 | A  | * | 3/2000  | Simons et al.   | 717/156 |
| 6,832,370 | B1 | * | 12/2004 | Srinivasan et al. | 717/161 |
| 2003/0120882 | A1 |   | 6/2003  | Granston et al. | |
| 2003/0135724 | A1 | * | 7/2003  | Krishnamurthy et al. | 712/245 |
| 2004/0177351 | A1 |   | 9/2004  | Stringer        | |
| 2006/0158354 | A1 | * | 7/2006  | Aberg et al.    | 341/50 |
| 2006/0200651 | A1 |   | 9/2006  | Collopy et al.  | |
| 2009/0282227 | A1 |   | 11/2009 | Hoover et al.   | |
| 2010/0042816 | A1 | * | 2/2010  | Gonion et al.   | 712/222 |
| 2011/0307507 | A1 | * | 12/2011 | Zhou et al.     | 707/769 |

FOREIGN PATENT DOCUMENTS

WO    2014/160837 A1    10/2014

OTHER PUBLICATIONS

Kemal Ebcioğlu, Erik R. Altman, Michael Gschwind, and Sumedh Sathaye. 1999. Optimizations and oracle parallelism with dynamic translation. In Proceedings of the 32nd annual ACM/IEEE international symposium on Microarchitecture (MICRO 32). IEEE Computer Society, Washington, DC, USA, 284-295.*

Dasdan, A.; Irani, S.S.; Gupta, R.K., "Efficient algorithms for optimum cycle mean and optimum cost to time ratio problems," Design Automation Conference, 1999. Proceedings. 36th , vol., No., pp. 37,42, 1999.*

(Continued)

*Primary Examiner* — James D Rutten
(74) *Attorney, Agent, or Firm* — Jordan IP Law, LLC

(57) ABSTRACT

Apparatuses and methods may provide for determining a level of performance for processing one or more loops by a dynamic compiler and executing code optimizations to generate a pipelined schedule for the one or more loops that achieves the determined level of performance within a prescribed time period. In one example, a dependence graph may be established for the one or more loops, and each dependence graph may be partitioned into stages based on the level of performance.

19 Claims, 5 Drawing Sheets

(56) References Cited

OTHER PUBLICATIONS

Michael L. Littman, Thomas L. Dean, and Leslie Pack Kaelbling. 1995. On the complexity of solving Markov decision problems. In Proceedings of the Eleventh conference on Uncertainty in artificial intelligence (UAI'95), Philippe Besnard and Steve Hanks (Eds.). Morgan Kaufmann Publishers Inc., San Francisco, CA, USA, 394-402.*

Miltersen, 2013, "Recent Results on Howard's Algorithm" Springer Berlin Heidelberg, Mathematical and Engineering Methods in Computer Science 2012, Lecture Notes in Computer Science 7721, pp. 53-56.*

Rau, "Iterative Modulo Scheduling: An Algorithm for Software Pipelining Loops", Proceedings of the 27th Annual International Symposium on Microarchitecture, Nov. 30-Dec. 2, 1994, pp. 63-74.

Calland et al., "Circuit Retiming Applied to Decomposed Software Pipelining", IEEE Transactions on Parallel and Distributed Systems, vol. 9, Issue: 1, Jan. 1998, 1 Page of Abstract Only.

Chao et al., "Rotation scheduling: a Loop Pipelining Algorithm", IEEE Transactions on Computer-Aided Design of Integrated Circuits and Systems, Mar. 1997, 7 Pages.

Clark et al., "VEAL: Virtualized Execution Accelerator for Loops", 35th International Symposium on Computer Architecture, Jun. 21-25, 2008, 12 Pages.

Cochet-Terrasson et al., "Numerical Computation of Spectral Elements in Max-Plus Algebra", Proceedings Conference on System Structure and Control, Jul. 8-11, 1998, pp. 667-674.

International Search Report and Written Opinion received for PCT Patent Application No. PCT/US2014/031975, mailed on Jul. 31, 2014, 10 Pages.

* cited by examiner

FIG. 1
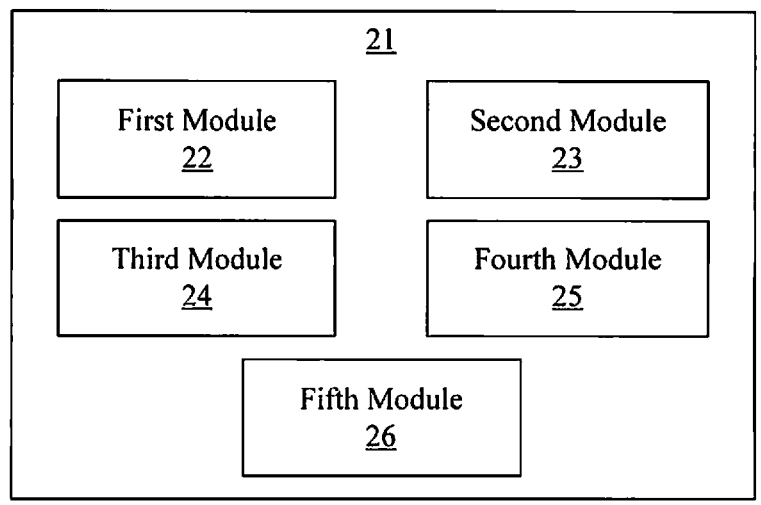
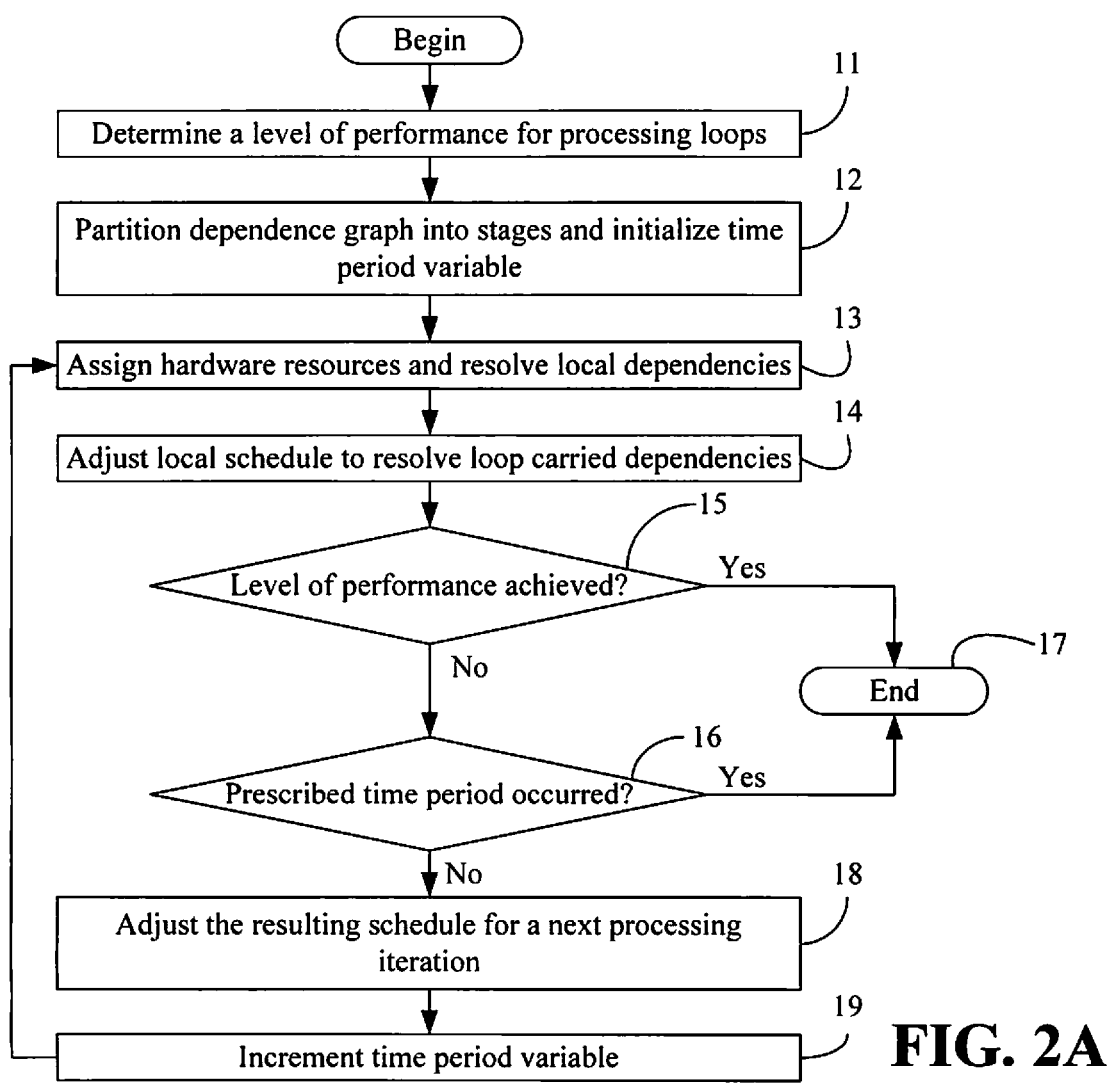
FIG. 2A

```
for (i=0; i<N; i++) {
        a
        b
        c
        d
}
```
FIG. 3A
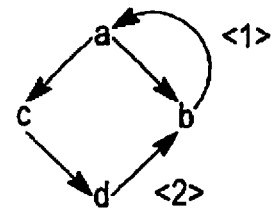
FIG. 3B
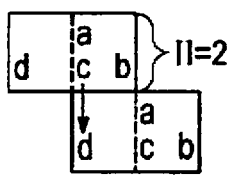
FIG. 3C
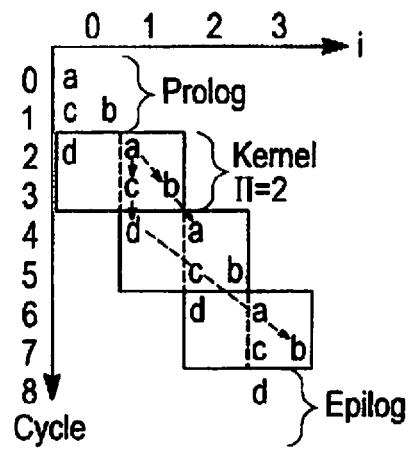
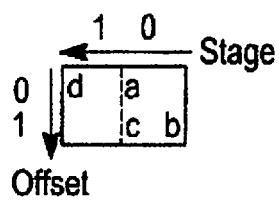
FIG. 3D
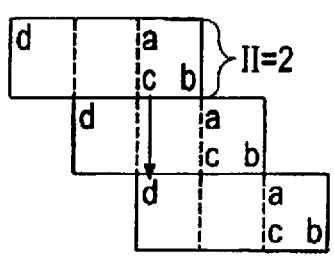
FIG. 3E

SOFTWARE PIPELINING AT RUNTIME

FIELD OF THE INVENTION

Embodiments described herein generally relate to software pipelining, and more particularly to performing software pipelining in dynamic compilers.

BACKGROUND

Software pipelining may be an efficient compiler technique that exploits instruction-level parallelism from loops. Conventional software pipelining may be limited to deployment in static compilers, which may not be suitable for dynamic compilation activities such as those involved in hardware/software co-design, dynamic languages, cloud computing and embedded systems.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a block diagram of an example of an apparatus according to an embodiment;

FIGS. 2A and 2B are flowcharts of examples of methods according to embodiments;

FIGS. 3A-3E are pictorial illustrations of a scenario according to an embodiment.

DETAILED DESCRIPTION

Figure 2B:
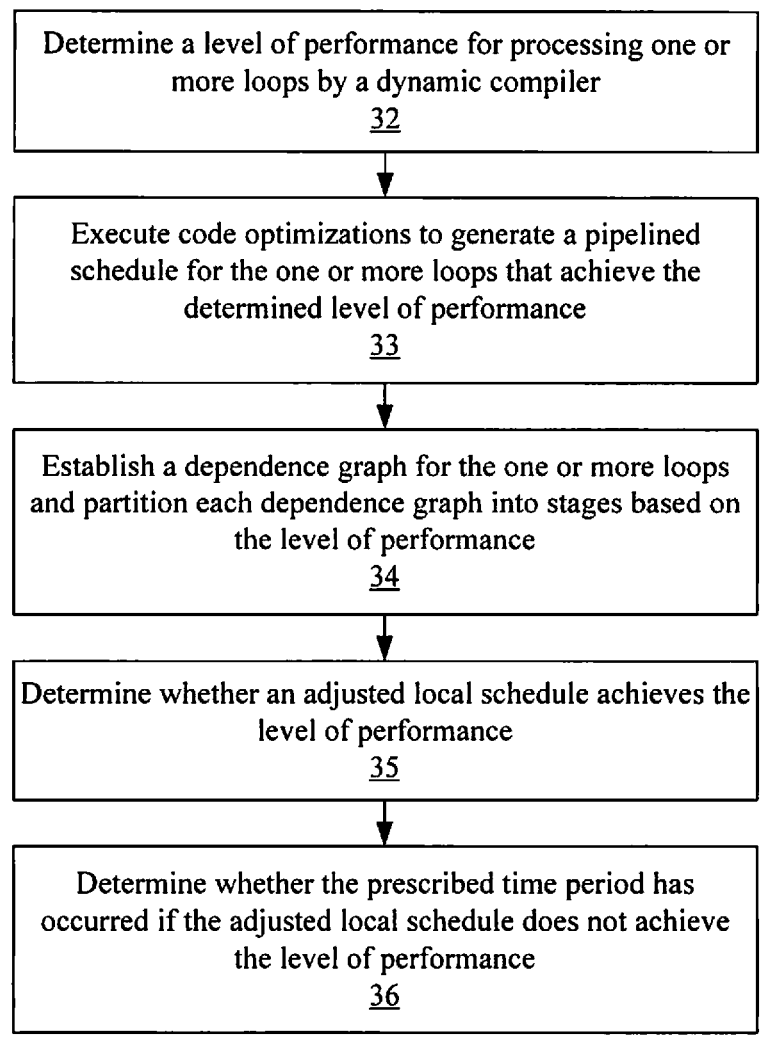

Turning now to FIG. 1, an apparatus 21 to perform software pipelining for dynamic compilers is illustrated. The illustrated apparatus 21 includes a first module 22, a second module 23, a third module 24, a fourth module 25 and a fifth module 26. The first module 22 may determine a level of performance for processing one or more loops by a dynamic compiler, wherein the level of performance is determined by calculating a minimum initiation interval (MII). The second module 23 may execute code optimizations to generate a pipelined schedule for the one or more loops that achieves the determined level of performance within a prescribed time period, wherein the executed code optimizations include assigning hardware resources and determining local dependences for the instructions included in each partitioned stage to generate a local schedule.

Additionally, the executed code optimizations may include adjusting the local schedule to resolve loop-carried dependences to create an adjusted local schedule and moving instructions from their current stages to a next stage to generate a next iteration schedule if the adjusted local schedule does not achieve the level of performance and the prescribed time period has not occurred. The executed code optimizations may be repeated to generate a new adjusted local schedule using the next iteration schedule as long as the prescribed time period has not occurred until the adjusted local schedule achieves the level of performance.

The third module 24 may establish a dependence graph for the one or more loops and partition each dependence graph into stages based on the level of performance. The fourth module 25 may determine whether an adjusted local schedule achieves the level of performance and the fifth module 26 may determine whether a prescribed time period has occurred if the adjusted local schedule does not achieve the level of performance. The illustrated apparatus 21 may therefore be useful in optimizing code for dynamic compilation activities such as those involved in hardware/software co-design, dynamic languages, cloud computing, and embedded systems.

FIG. 2A illustrates a method of performing software pipelining at run-time for dynamic compilers. The illustrated method may be implemented as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality hardware using assembly language programming and circuit technology such as, for example, application specific integrated circuit (ASIC), complementary metal oxide semiconductor (CMOS) or transistor-transistor logic (TTL) technology, or any combination thereof. For example, computer program code to carry out operations shown in the illustrated method may be written in any combination of one or more programming languages, including an object oriented programming language such as C++ or the like and conventional procedural programming languages, such as the "C" programming language or similar programming languages. Moreover, the method may be implemented using any of the aforementioned circuit technologies.

The method may generally perform software pipelining optimizations by overlapping the execution of loop iterations without violating any dependence or resource constraints. The illustrated method begins at process block 11 by calculating a minimum initiation interval (MII). The minimum initiation interval may be the shortest period of time between the start of a loop iteration to the start of the next loop iteration. In one example, the shorter the initiation interval, the smaller the number of cycles required to complete the loop process and the faster the loop process may be executed using software pipelining. Additionally, as a byproduct of calculating the MII, critical operations may be identified and given priority during subsequent scheduling.

For a given loop, such as, for example, the loop illustrated in FIG. 3A, a dependence graph is established. A dependence graph is illustrated, for example, in FIG. 3B. In the graph, there are two loop-carried dependence edges illustrated, d→b and b→a, each having an iteration distance value of (1). Dependence edge c→d has a latency of two cycles. The other dependences are local, and therefore they have an iteration distance value of (0). Strongly connected components (SCC) may be identified from the dependence graph using an algorithm, such as, for example, Tarjan's strongly connected components algorithm.

The minimum initiation interval may be calculated using the identified SCC in an algorithm, such as, for example, the Howard Iteration Policy algorithm, which may be implemented as follows:

MIICalculation(H), where H is the maximum times a SCC is scanned in the Howard Iteration Policy algorithm.

---

Identify SCCs in the dependence graph
MII ← − ∞
for each SCC do
   calculate the generalized maximal circuit mean of the SCC with Howard Iteration Policy algorithm, but abort when the policy does not stabilize after scanning the SCC for H times
   MII = max(MII, the generalized maximal circuit mean)

```
isCritical(a) ← FALSE ∀ operation a
for each SCC do
    if MII = the SCC's generalized maximal circuit mean then
        isCritical(a) ← TRUE ∀ operation a ∈ the critical cycles in the
SCC's policy graph.
```

The preceding pseudocode effectively constrains the algorithm to have a complexity that is less than exponential.

At process block 12, the illustrated method partitions the dependence graph into an initial set of stages to form an initial schedule that is close to an optimal schedule. Process block 12 may also provide for initializing a time period variable (e.g., "i", discussed in greater detail below). Each stage may have a predetermined height of MII. For example, if the dependence graph illustrated in FIG. 3B is cut such that each stage has MII cycles, the resulting initial schedule is illustrated in FIG. 3C, when MII equals two (2).

The dependence graph may be partitioned using an algorithm, such as, for example, the Bellman-Ford algorithm. The algorithm may calculate the longest path from a pseudo start node to each node in the dependence graph. In one example, the path length for a node divided by MII is the stage index for the node. Such an approach may create an initial schedule, where each node has been assigned a stage. In this process, each edge (a→b, δ, d) may have a length of δ−d*MII, and the pseudo start may connect to any other node with a length 0. Edge a→b, δ, d has a dependence from a→b, where δ is the latency and d is the iteration distance. The calculated longest path may be divided into stages.

The algorithm may be implemented, for example, as follows, using threshold value B to control the number of iterations of the Bellman-Ford algorithm. Once the number of iterations reaches B and the algorithm is not finished, the entire method aborts.

```
len(a) ← 0 ∀ operation a
for i ← 1 to |V| − 1 do
    changed ← FALSE
    for each operation b in the order in the original loop body do
        len(b) ← max(len(b), len(a) + δ − d * MII) ∀ (a→b,δ,d)
        changed←TRUE if len(b) is changed by the previous step
    if changed=FALSE then
        break
    if (i < |V| − 1) and (i = B) then
        abort software pipelining
stage(a) ← len(a)/MII  ∀ node (a)
offset(a) ← len(a) mod MII ∀ node a
d ← d + stage(b) − stage(a) ∀(a → b, δ, d)
```

At process block 13, the illustrated method begins to execute code optimizations to generate a pipelined schedule and achieve the calculated MII. In particular, at process block 13, the illustrated method may assign hardware resources, enforce local dependences for the instructions in the partitioned stages and create a local schedule. Each operation within an instruction may be assigned a resource and an offset. Process block 13 may be implemented, for example, with an algorithm as follows:

```
height(a) ← − ∞ ∀ operation a
for each operation a in reverse order in the current kernel do
    for each outgoing edge (a → b, δ, d) do
        height(a) ← max(height(a); height(b) + δ − d *MII)
    height(a) ← + ∞ ∀a, isCritical(a) =TRUE
```

Apply, for example, any list scheduling that works on local dependences and under the resource constraints with the height priority function.

At process block 14, the illustrated method may continue to execute code optimizations by adjusting the local schedule to resolve loop-carried dependences. For each loop-carried dependence that is not resolved with the local schedule, one or more empty stages may be inserted between the source and destination instruction to try to resolve the loop-carried dependence (i.e. horizontal kernel expansion). Such an approach stretches the time distance between the two operations to be no less than the latency of the dependence. FIG. 3D illustrates a local schedule with loop-carried dependences. By adding an empty stage between c and d, as illustrated in FIG. 3E, the dependence is resolved.

In order to resolve loop-carried dependences, which have not been resolved during process block 13, kernel expansion may be performed, for example, as follows:

Let (a→b, δ, d) be an unresolved loop-carried dependence graph in the original dependence graph before any executed code optimizations. As the first choice, an attempt to increase time distance d by horizontal kernel expansion by inserting empty stages between the source and sink nodes of the loop-carried dependence is performed. Such an approach may force their time difference to meet or exceed the latency of the dependence, and thus resolve the dependence without increasing the initiation interval. As another approach, where there is any loop-carried dependence that cannot be resolved by inserting empty stages, the initiation interval (II) may be increased.

When inserting new stages, prior dependences that have already been satisfied may not be violated. If the sink node stage of a particular dependence is before the source node stage of the dependence, then inserting a stage between them may only decrease the time difference. In short, for a dependence, there may be "forbidden" stages and "expandable" stages. Inserting empty stages immediately before any forbidden (expandable) stage may decrease (increase) the time difference between the source and sink of the dependence. Formally, for an edge e: a→b, forbidden(e)={s|stage(b)<s≤stage(a)}expandable(e)={s|stage(a)<s≤stage(b)}. Stage (o) may be the stage index of operation o.

Note that both sets may be composed of stages between the source and sink nodes' stages, because if empty stages are inserted before both (or after both) of the source and sink nodes' stages, there would be no impact on the time difference.

Now for an unresolved dependence, in order to resolve it without changing the initiation interval (II), the minimum number of stages to insert immediately before one of its expandable stages may be derived from:

δ≤d*II+offset(b)−offset(a)], where offset (o) is the time offset of operation o in its stage in the kernel.

$$newStages(e) = δ - offset(b) + offset(a))/II - d$$

Essentially, a global set of forbidden stages may be computed, wherein the global set is the union of the forbidden stages of all the dependences. For each stage s, a record may be made of the number of new stages inserted before it by a variable, newStagesBefore (s), initialized as 0. Then all loop-carried dependences may be scanned, and the illustrated method decides where to insert new stages and how many. In case any loop-carried dependence (a→b, cannot be resolved by inserting empty stages, initiation interval (II) is increased to resolve it. The minimum II to resolve it may be feasibleII (e)=[offset(b)+offset (a))/d].

An algorithm to perform kernel expansion may be implemented, for example, as follows:

```
m ← the total stages of the current kernel
F ← ∪ forbidden (e) ∀ dependence e
newStagesBefore(s) ← 0 ∀ stage s
for each dependence e : (a → b,δ, d) d ≠ 0 do
    if δ ≤ d * II + offset(b) − offset(a)], does not hold then
        if expandable(e) − F ≠ { }then
            n ← newStages(e)
            m ← m + n
            if m > S, where S is the maximum number of stages
allowed in a kernel, then II ← max(II, feasibleII(e)) ∀ dependence e,
and then the kernel expansion process ends.
                s ← any stage ∈ expandable (e) − F
                newStagesBefore(x) ← newStagesBefore(x) + n
∀ stage x > = s
stage(a) ← stage(a) + newStagesBefore(stage(a)) ∀ node a
d ← d + newStagesBefore(stage(b)) − newStagesBefore(stage(a)) and
after that let II ← max(II, feasibleII(e)), ∀ (a →b, δ, d).
```

At process block 15, the illustrated method may determine whether the adjusted local schedule, which is the resulting schedule after process block 14 is executed, has achieved the calculated MII. If so, the process stops and the illustrated method terminates, at process block 17. If not, the illustrated method determines if a prescribed time period has occurred, at process block 16. For example, the illustrated method may determine if a time period variable (e.g., variable "i") is equal to the prescribed time period. The prescribed time period may be, a threshold value, such as, for example, a predefined number of iterations. Each time the illustrated method executes process blocks 13 and 14, an iteration has occurred, and variable (i) is incremented accordingly in process block 19. The executed code optimizations may be performed a limited number of times before the illustrated method aborts. Therefore, if the illustrated method determines that the prescribed time period has occurred, then the illustrated method terminates at process block 17.

At process block 18, the illustrated method modifies the adjusted local schedule to create a more compact schedule for a next processing iteration. The adjusted local schedule may be modified by moving instructions from their current stages to their next stages based on the current schedule in an effort to generate a schedule that achieves the calculated minimum initiation interval. Such an approach generates a next iteration schedule for a next iteration of code optimizations. The illustrated method repeats the code optimizations so long as the prescribed time period has not occurred (i.e. i≠prescribed time period) until an adjusted local schedule is obtained that achieves the calculated minimum initiation interval.

At process block 19, the illustrated method may increment variable (i) for a next processing iteration, and the method returns to process block 13 to continue execution.

FIG. 2B illustrates a method of performing pipelining. The illustrated method may be implemented as a set of logic instructions and/or firmware stored in a machine- or computer-readable medium such as RAM, ROM, PROM, flash memory, etc., in configurable logic such as, for example, PLAs, FPGAs, CPLDs, in fixed-functionality hardware using assembly language programming and circuit technology such as, for example, ASIC, CMOS or TTL technology, or any combination thereof.

The illustrated method at process block 32 provides for determining a level of performance for processing one or more loops by a dynamic compiler, wherein the level of performance is determined by calculating a minimum initiation interval (MII). At process block 33, the illustrated method provides for executing code optimizations to generate a pipelined schedule for the one or more loops that achieves the determined level of performance within a prescribed time period at process block 33, wherein the executed code optimizations include assigning hardware resources and determining local dependences for the instructions included in each partitioned stage to generate a local schedule.

Further, the executed code optimizations may include adjusting the local schedule to resolve loop-carried dependences to create an adjusted local schedule and moving instructions from their current stages to a next stage to generate a next iteration schedule if the adjusted local schedule does not achieve the level of performance and the prescribed time period has not occurred. The executed code optimizations may be repeated to generate a new adjusted local schedule using the next iteration schedule as long as the prescribed time period has not occurred until the adjusted local schedule achieves the level of performance.

At process block 34, a dependence graph for the one or more loops is established and each dependence graph is partitioned into stages based on the level of performance. The illustrated method at process block 35 determines whether an adjusted local schedule achieves the level of performance and at process block 36 the illustrated method determines whether a prescribed time period has occurred if the adjusted local schedule does not achieve the level of performance.

Figure 4:
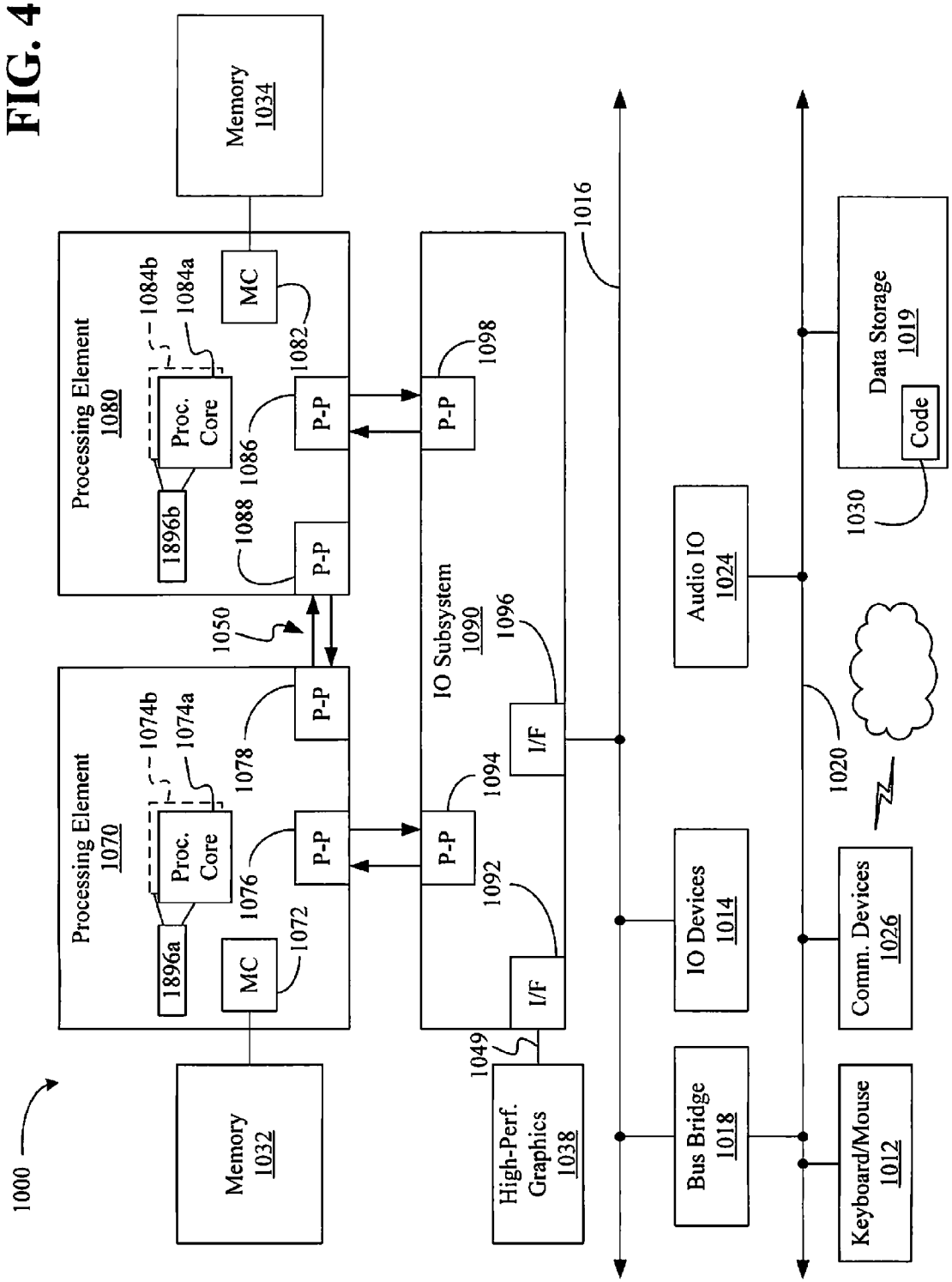
FIG. 4 is a block diagram of an example of a system according to an embodiment.

Turning now to FIG. 4, a diagram of a microprocessor system is illustrated. Shown in FIG. 4 is a multiprocessor system 1000 that may include a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 4 may be implemented as multi-drop bus rather than point-to-point interconnect.

As shown in FIG. 4, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 4, MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discrete logic outside the processing elements 1070, 1080 rather than integrated therein.

First processing element 1070 and second processing element 1080 may be coupled to an I/O subsystem 1090 via P-P interconnects 1076, 1086 and 1084, respectively. As shown in FIG. 4, I/O subsystem 1090 may include P-P interfaces 1094 and 1098. Furthermore, I/O subsystem 1090 may include an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 4, various I/O devices 1014 may be coupled to first bus 1016, along with a bus bridge 1018 which may couple first bus 1016 to a second bus 1010. In one embodiment, second bus 1010 may be a low pin count (LPC) bus. Various devices may be coupled to second bus 1010 including, for example, a keyboard/mouse 1012, communication device(s) 1026 (which may in turn be in communication with the computer network 503), and a data storage unit 1019 such as a disk drive or other mass storage device which may include code 1030, in one embodiment. The code 1030 may include instructions for performing embodiments of one or more of the methods described above, such as, for example, the methods of FIGS. 2A and/or 2B. Further, an audio I/O 1024 may be coupled to second bus 1010.

Note that other embodiments are contemplated. For example, instead of the point-to-point architecture of FIG. 4, a system may implement a multi-drop bus or another such communication topology. Also, the elements of FIG. 4 may alternatively be partitioned using more or fewer integrated chips than shown in FIG. 4.

Figure 5:
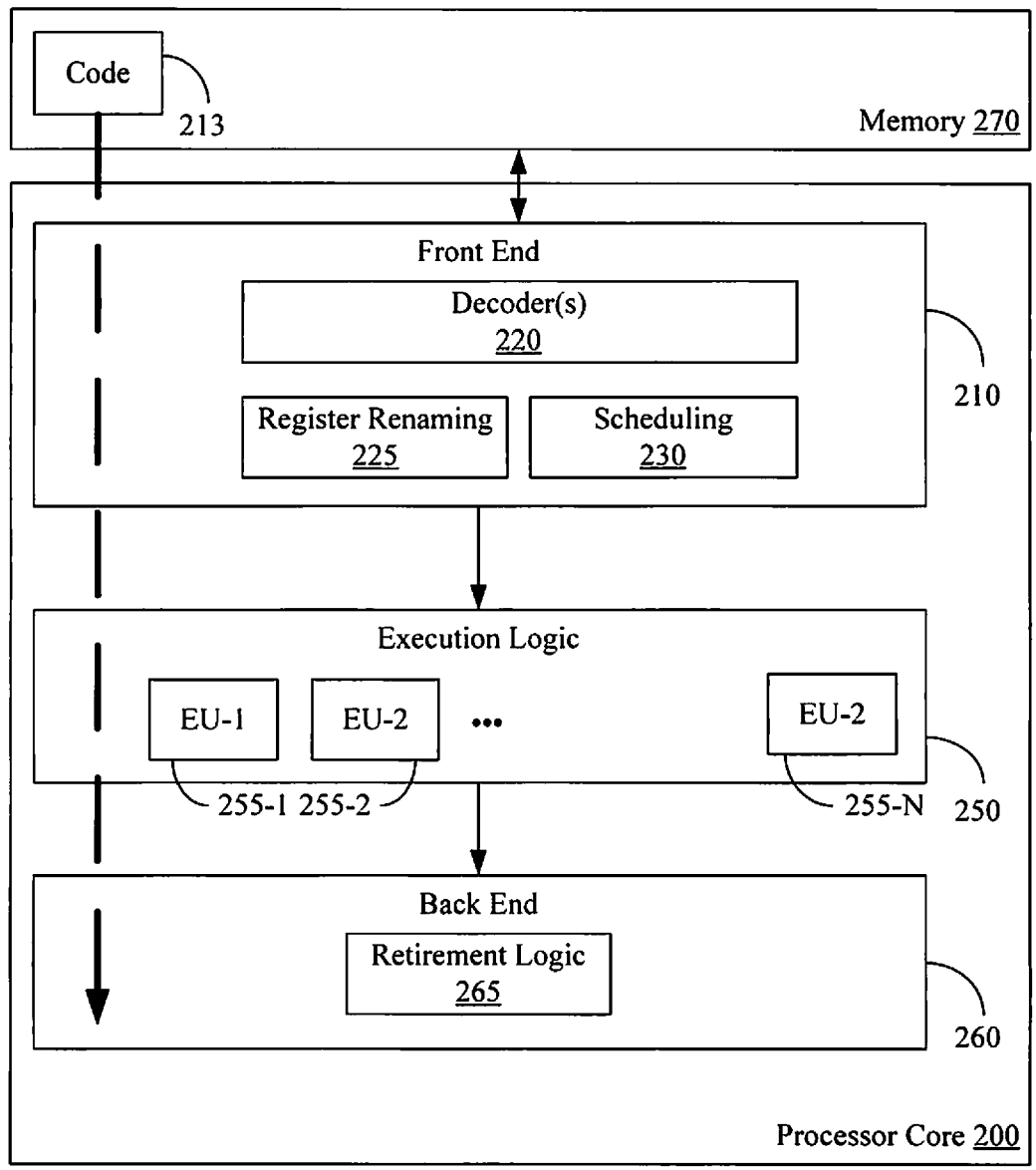
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the methods illustrated in FIGS. 2A and/or 2B. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 may also include register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Additional Notes and Examples

Example 1 may include an apparatus to perform pipelining. The apparatus may include a first module to determine a level of performance for processing one or more loops by a dynamic compiler; and a second module to execute code optimizations to generate a pipelined schedule for the one or more loops that achieves the determined level of performance within a prescribed time period.

Example 2 may include the apparatus of example 2, further including a third module to establish a dependence graph for the one or more loops and partition each dependence graph into stages based on the level of performance.

Example 3 may include the apparatus of claim 2, further including a fourth module to determine whether an adjusted local schedule achieves the level of performance and a fifth module to determine whether the prescribed time period has occurred if the adjusted local schedule does not achieve the level of performance.

Example 4 may include the apparatus of any one of examples 1 to 3, wherein the level of performance is determined by calculating a minimum initiation interval (MII).

Example 5 may include the apparatus of example 3, wherein the executed code optimizations include assigning hardware resources and resolving local dependences for all instructions included in each partitioned stage to generate a local schedule.

Example 6 may include the apparatus of example 5, wherein the executed code optimizations include adjusting the local schedule to resolve loop-carried dependences and create the adjusted local schedule.

Example 7 may include the apparatus of example 6, wherein the executed code optimizations include moving instructions from their current stages to a next stage to generate a next iteration schedule if the adjusted local schedule does not achieve the level of performance and the prescribed time period has not occurred.

Example 8 may include the apparatus of example 7, wherein the executed code optimizations are repeated to generate a new adjusted local schedule using the next iteration schedule, as long as the prescribed time period has not occurred, until the adjusted local schedule achieves the level of performance.

Example 9 may include at least one computer readable medium comprising one or more instructions that when executed on a computing device configure the computing device to determine a level of performance for processing one or more loops by a dynamic compiler; and execute code optimizations to generate a pipelined schedule for the one or more loops that achieves the determined level of performance within a prescribed time period.

Example 10 may include the at least one computer readable medium of example 9, further including establishing a dependence graph for the one or more loops and partitioning each dependence graph into stages based on the level of performance.

Example 11 may include the at least one computer readable medium of example 10, further including determining whether an adjusted local schedule achieves the level of performance; and determining whether the prescribed time period has occurred if the adjusted local schedule does not achieve the level of performance.

Example 12 may include the at least one computer readable medium of any one of examples 9 to 11, wherein the level of performance is to be determined by calculating a minimum initiation interval (MII).

Example 13 may include the at least one computer readable medium of example 11, wherein the executed code optimizations are to include assigning hardware resources and resolving local dependences for the instructions included in each partitioned stage to generate a local schedule.

Example 14 may include the at least one computer readable medium of example 13, wherein the executed code optimizations are to include adjusting the local schedule to resolve loop-carried dependences and create the adjusted local schedule.

Example 15 may include the at least one computer readable medium of example 14, wherein the executed code optimizations are to include moving instructions from their current stages to a next stage to generate a next iteration schedule if the adjusted local schedule does not achieve the level of performance and the prescribed time period has not occurred.

Example 16 may include the at least one computer readable medium of claim 15, wherein the executed code optimizations are to be repeated to generate a new adjusted local schedule using the next iteration schedule, as long as the prescribed time period has not occurred, until the adjusted local schedule achieves the level of performance.

Example 17 may include a method of performing pipelining including determining a level of performance for processing one or more loops by a dynamic compiler and executing code optimizations to generate a pipelined schedule for the one or more loops that achieves the determined level of performance within a prescribed time period.

Example 18 may include the method of example 17, further including establishing a dependence graph for the one or more loops and partitioning each dependence graph into stages based on the level of performance.

Example 19 may include the method of example 18, further including determining whether an adjusted local schedule achieves the level of performance and determining whether the prescribed time period has occurred if the adjusted local schedule does not achieve the level of performance.

Example 20 may include the method of any one of examples 17 to 19, wherein the level of performance is to be determined by calculating a minimum initiation interval (MII).

Example 21 may include the method of example 19, wherein the executed code optimizations include assigning hardware resources and resolving local dependences for the instructions included in each partitioned stage to generate a local schedule.

Example 22 may include the method of example 21, wherein the executed code optimizations include adjusting the local schedule to resolve loop-carried dependences and create the adjusted local schedule.

Example 23 may include the method of example 22, wherein the executed code optimizations include moving instructions from their current stages to a next stage to generate a next iteration schedule if the adjusted local schedule does not achieve the level of performance and the prescribed time period has not occurred.

Example 24 may include the method of example 23, wherein the executed code optimizations are repeated to generate a new adjusted local schedule using the next iteration schedule, as long as the prescribed time period has not occurred, until the adjusted local schedule achieves the level of performance.

Example 25 may include an apparatus to perform pipelining comprising means for performing any one of the methods of examples 17 to 24.

Examples may provide a computer readable storage medium having a set of instructions which, if executed by the processor, cause the processor to determine a level of performance for processing one or more loops by a dynamic compiler and execute code optimizations to generate a pipelined schedule for the one or more loops that achieves the determined level of performance within a prescribed time period.

Other examples may provide a computer readable medium having a set of instructions which, if executed by the processor, cause the processor to calculate a minimum initiation interval for processing one or more loops by a dynamic compiler and generate a pipelined schedule for one or more loops that achieves the calculated minimum initiation interval within a prescribed time period.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

The machine readable medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format.

Program code, or instructions, may be stored in, for example, volatile and/or non-volatile memory, such as storage devices and/or an associated machine readable or machine accessible medium including, but not limited to, solid-state memory, hard-drives, floppy-disks, optical storage, tapes, flash memory, memory sticks, digital video disks, digital versatile discs (DVDs), etc., as well as more exotic mediums such as machine-accessible biological state preserving storage.

The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus to perform pipelining comprising:
a first circuit to determine a level of performance for processing one or more loops by a dynamic compiler;
a second circuit to execute code optimizations to generate a pipelined schedule for the one or more loops that achieves the determined level of performance within a prescribed time period; and
a third circuit to establish a dependence graph for the one or more loops and partition each dependence graph into stages based on the level of performance, wherein the level of performance is to be based on a calculated minimum initiation interval (MII) that is calculated via a Howard Iteration Policy (HIP) algorithm from the dependence graph, wherein the HIP algorithm is constrained to have a complexity that is less than exponential.

2. The apparatus of claim 1, further comprising:
a fourth circuit to determine whether an adjusted local schedule achieves the level of performance; and a fifth circuit to determine whether the prescribed time period has occurred if the adjusted local schedule does not achieve the level of performance.

3. The apparatus of claim 2, wherein the HIP algorithm is constrained to run no more than a predetermined number of times.

4. The apparatus of claim 2, wherein the executed code optimizations include assigning hardware resources and resolving local dependences for instructions included in each partitioned stage to generate a local schedule.

5. The apparatus of claim 4, wherein the executed code optimizations include adjusting the local schedule to resolve loop-carried dependences and create the adjusted local schedule.

6. The apparatus of claim 5, wherein the executed code optimizations include moving instructions from their current stages to a next stage to generate a next iteration schedule if the adjusted local schedule does not achieve the level of performance and the prescribed time period has not occurred.

7. The apparatus of claim 6, wherein the executed code optimizations are repeated to generate a new adjusted local schedule using the next iteration schedule, as long as the prescribed time period has not occurred, until the adjusted local schedule achieves the level of performance.

8. At least one non-transitory computer readable medium comprising one or more instructions that when executed on a computing device configure the computing device to:
determine a level of performance for processing one or more loops by a dynamic compiler;
execute code optimizations to generate a pipelined schedule for the one or more loops that achieves the determined level of performance within a prescribed time period; and
establish a dependence graph for the one or more loops and partition each dependence graph into stages based on the level of performance, wherein the level of performance is to be based on a calculated minimum initiation interval (MII) that is calculated via a Howard Iteration Policy (HIP) algorithm from the dependence graph, wherein the HIP algorithm is constrained to have a complexity that is less than exponential.

9. The at least one computer readable medium of claim 8, further comprising one or more instructions that when executed by the processor configure the processor to:
determine whether an adjusted local schedule achieves the level of performance; and
determine whether the prescribed time period has occurred if the adjusted local schedule does not achieve the level of performance.

10. The at least one computer readable medium of claim 9, wherein the HIP algorithm is constrained to run no more than a predetermined number of times.

11. The at least one computer readable medium of claim 9, wherein the executed code optimizations are to include assigning hardware resources and resolving local dependences for instructions included in each partitioned stage to generate a local schedule.

12. The at least one computer readable medium of claim 11, wherein the executed code optimizations are to include adjusting the local schedule to resolve loop-carried dependences and create the adjusted local schedule.

13. The at least one computer readable medium of claim 12, wherein the executed code optimizations are to include moving instructions from their current stages to a next stage to generate a next iteration schedule if the adjusted local schedule does not achieve the level of performance and the prescribed time period has not occurred.

14. The at least one computer readable medium of claim 13, wherein the executed code optimizations are to be repeated to generate a new adjusted local schedule using the next iteration schedule, as long as the prescribed time period has not occurred, until the adjusted local schedule achieves the level of performance.

15. A method of performing pipelining comprising:
determining a level of performance for processing one or more loops by a dynamic compiler;
executing code optimizations to generate a pipelined schedule for the one or more loops that achieves the determined level of performance within a prescribed time period; and
establishing a dependence graph for the one or more loops and partitioning each dependence graph into stages based on the level of performance, wherein the level of performance is based on a calculated minimum initiation interval (MII) that is calculated via a Howard Iteration Policy (HIP) algorithm from the dependence graph, wherein the HIP algorithm is constrained to have a complexity that is less than exponential.

16. The method of claim 15 further comprising:
determining whether an adjusted local schedual achieves the level of performance; and
determining whether the prescribed time period has occurred if the adjusted local schedual does not achieve the level of performance.

17. The method of claim 16 wherein the HIP algorithm is constrained to run no more than a predetermined number of times.

18. The method of claim 15, wherein the code optimizations include kernel expansion to resolve local dependencies.

19. The method of claim 18, wherein for each loop-carried dependence that is not resolved within a local schedule, the kernel expansion includes inserting at least one empty stage between a source instruction and a destination instruction.

* * * * *